June 1, 1943.  H. C. BEHRENS  2,320,710
SPEED CONTROL MECHANISM FOR CUTOFFS
Filed Jan. 9, 1942  4 Sheets-Sheet 2
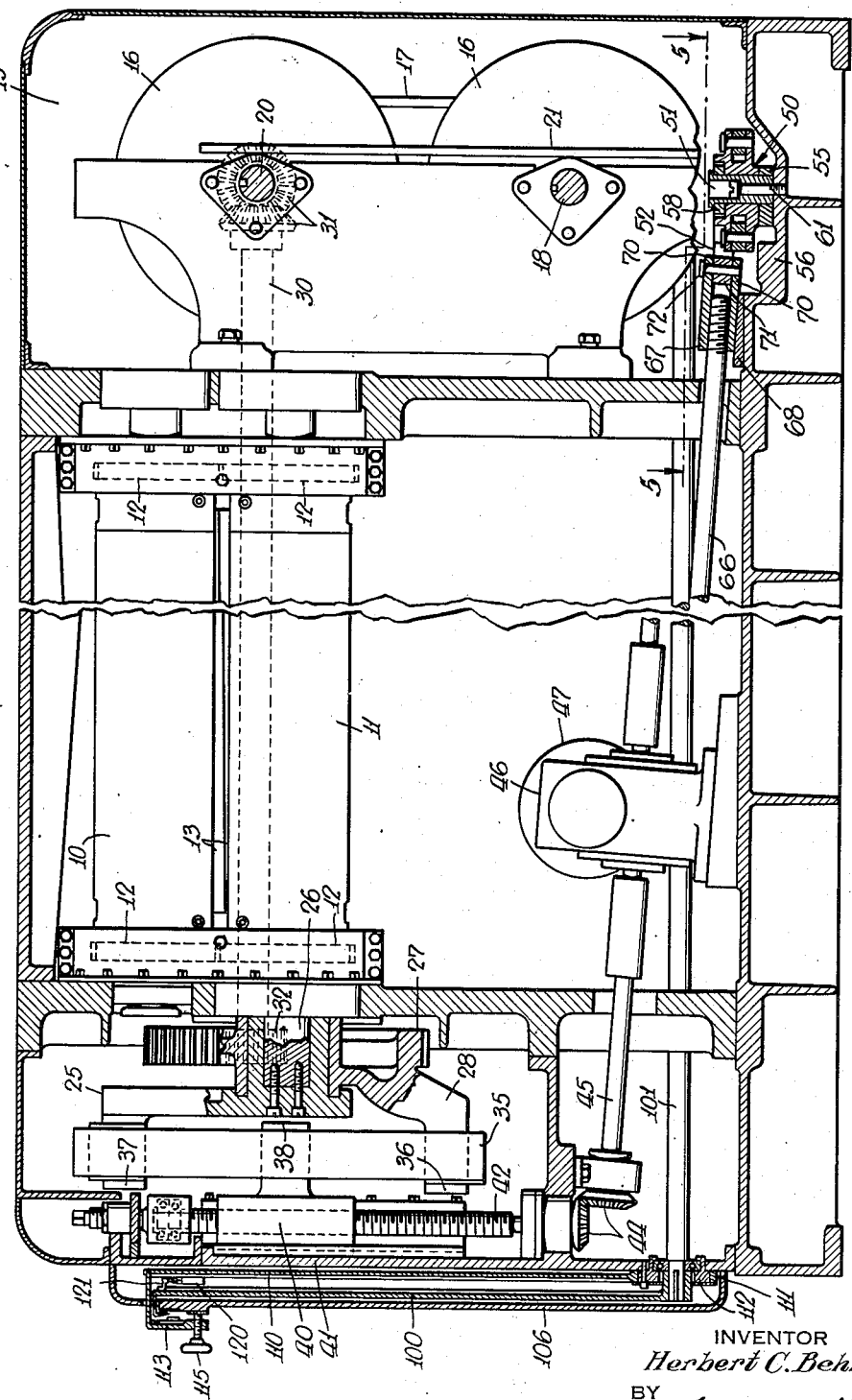
INVENTOR
*Herbert C. Behrens*
BY
*Dean Fairbank & ...*
ATTORNEYS

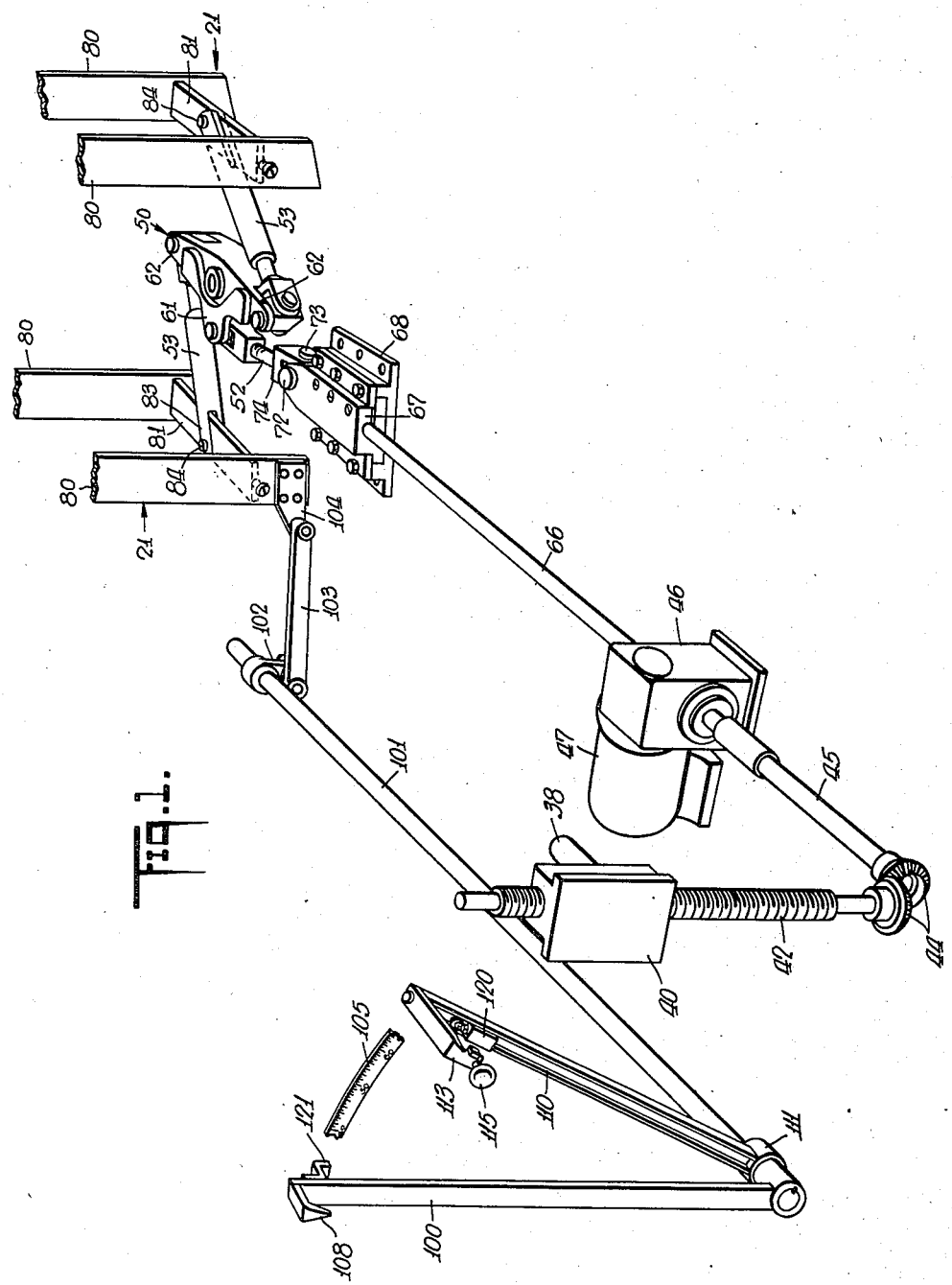

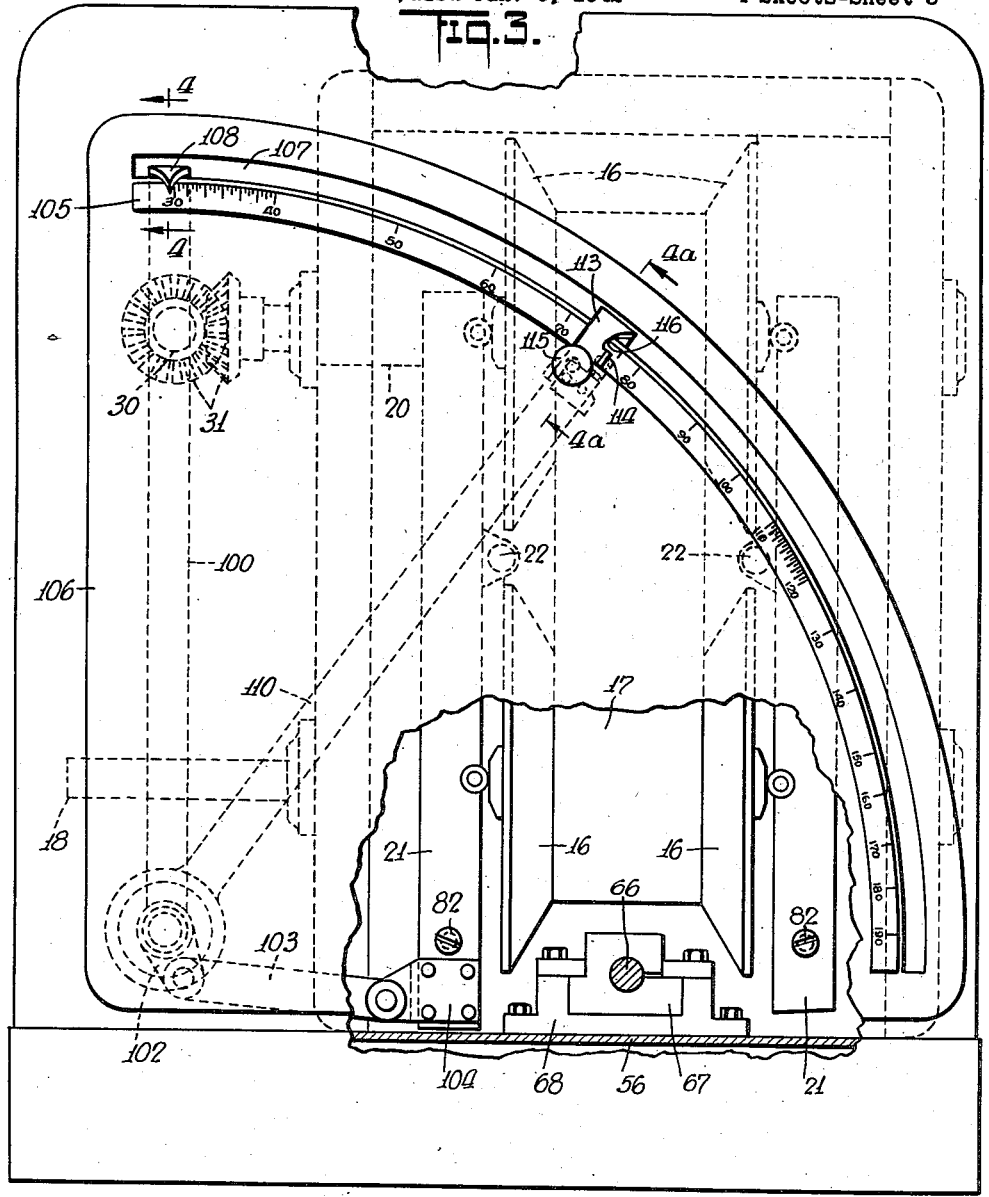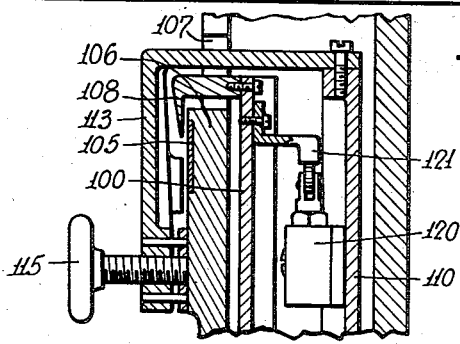

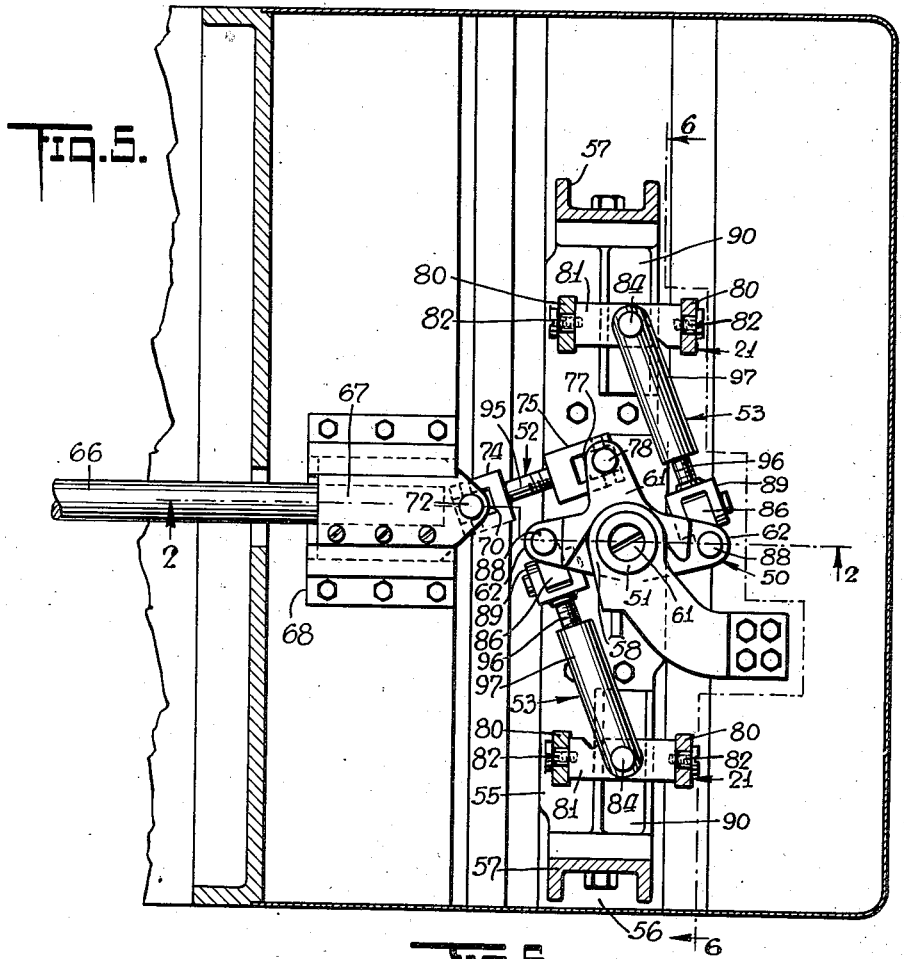

Patented June 1, 1943

2,320,710

UNITED STATES PATENT OFFICE 2,320,710

SPEED CONTROL MECHANISM FOR CUTOFFS

Herbert C. Behrens, Haddon Heights, N. J., assignor to Samuel M. Langston Co., Camden, N. J., a corporation of New Jersey Application January 9, 1942, Serial No. 426,139

14 Claims. (Cl. 164—66)

The present invention relates to machines for cutting continuously delivered sheet material, such as double-faced corrugated board, into sections, and more particularly to the adjusting means for selectively varying the length of the sections cut.

In a machine of this general type, there is usually provided a speed change transmission for changing the total time cycle of the cutting knives, and a speed varying mechanism for accelerating and decelerating said knives at adjustable rates during their cycle of operation to make the speed of said knives at the instant of cutting correspond to the speed of the material.

The speed change transmission is of the type in which infinite changes in velocity ratio can be obtained, within a definite range, by the movement of an adjusting member. Speed change transmissions commonly used in the art and known as a P. I. V. or Reeves drive are of this type. They usually comprise two pulleys, and a power transmitting belt passing over said pulleys, one or both of which have end sections adjustable relatively towards or away from each other to change the relative effective diameters of the pulleys, and thereby change the speed ratio of the drive. For convenience this general type of speed change transmission will hereinafter be referred to as a Reeves mechanism or drive.

When a mechanism for varying the speed of the cutter in its cycle is directly connected to a Reeves drive, or the two are simultaneously adjusted by a single operating member, it is ordinarily necessary to provide some form of compensating mechanism so that the speed of the cutter, when in the cutting part of its cycle, will coincide with that of the web being cut, irrespective of the wide variety of changes which may be effected in the total time cycle by changes in the adjustment of the Reeves drive to cut shorter or longer sections. A compensating mechanism in the form of cam gears 70, 71 is provided for this purpose in the Sieg Patent 1,897,867, and is shown in other later patents.

In the common form of the Reeves drive, a screw is employed with right hand and left hand threads at opposite end portions for drawing together or spreading apart the sections of one or both of the inclined faced pulley sections and it has been proposed to employ a compensating mechanism in the form of a cam operated in conjunction with such a screw. All such compensating mechanisms with which I am familiar are subject to various objections.

One object of the present invention is to provide a simple and positively acting mechanism for adjusting the Reeves, and which does not require the use of any cams or cam gears, but which will give a gradually varying degree of adjustment for equal increments of movement of the actuating member, and is compactly arranged with respect to said Reeves.

As a feature, the linkage for adjusting the Reeves includes a crank having link connections to the Reeves levers, and disposed between said levers, so that the plane in which the links move is at right angles to the plane in which said Reeves levers move. This construction permits the placement of the crank in compact position with respect to the Reeves unit, so that it does not extend beyond said unit, and also permits both Reeves levers to be of the same length and confined within the general outline of the usual form of Reeves unit.

A further object is to provide a simple form of positively acting linkage in place of the usual threaded shaft and traveling nuts, and which acts as the compensating mechanism.

A further object of the invention is to provide a simple and positively acting form of indicating mechanism which is directly connected to the Reeves drive and which is actuated thereby in the adjustment of the Reeves, and which will show directly and accurately the length of section which will be cut when the Reeves is in any particular adjusted position.

A further object is to provide a comparatively simple and effective device for correlating the adjusting movements of the Reeves drive and the speed varying mechanism so that upon adjusting the Reeves to vary the total time cycle of the cutter and cut a section of a particular and desired length, the speed of movement of the cutter at the instant of cutting will be maintained constant and substantially the same as that of the speed of sheet travel.

As a feature, the linkage for adjusting the Reeves drive is constructed so that its action may be modified to allow for any stretch which may occur in the Reeves belt, so that the proper relationship between the two adjusting mechanisms may be maintained.

The lever or other adjustable part of the Reeves drive moves through a short distance in covering the entire range of adjustment, and the span of the sheet length indicator scale is ordinarily large. Thus, any lost motion in the adjusting mechanisms registers as an increased ratio on this scale to such an extent as to render accurate setting of sheet length difficult.

As another feature of the present invention, there is provided a positive linkage between one of the Reeves adjustable parts and the sheet length indicating lever, so that there is no lost motion in the connection between the adjusting parts of the Reeves drive and the indicating device, and thus accurate setting of the sheet length is assured.

Various other objects, features and advantages of the invention will be apparent from the following particular description, and from an inspection of the accompanying drawings, in which Fig. 1 is a perspective view showing somewhat diagrammatically a form of cut-off adjusting mechanism embodying the present invention.

Fig. 2 is a vertical section through a cut-off, having a form of adjusting mechanism embodying the present invention and partially taken along line 2—2 of Fig. 5.

Fig. 3 is a side elevation of the cut-off shown with parts broken away to reveal a portion of the adjusting mechanism.

Fig. 4 is an enlarged composite of two sections taken on lines 4—4 and 4a—4a of Fig. 3.

Fig. 5 is a horizontal section taken on line 5—5 of Fig. 2, and

Fig. 6 is a vertical section taken on line 6—6 of Fig. 5.

The cutting mechanism shown in the drawings is of the travelling cut-off type, in which a pair of coacting knives come together at the instant of cutting and travel with the sheet during cutting action at substantially the same speed as said sheet. The invention is shown applied to a cutting machine of the rotary type, although so far as certain aspects of the invention are concerned, this may be of any suitable travelling type, such as that shown in the Langston Patent No. 1,359,076.

In the specific form shown, the cut-off comprises a pair of rotary cutter heads or drums 10 and 11 mounted for rotation about horizontal parallel axes, and connected together at one or both ends by intermeshing gears 12 to rotate said drums in opposite directions. The cutter heads 10 and 11 are provided with knives 13, which coact to cut into sections the sheet passing between the oppositely rotating cutter heads. A single knife on one might cut against a mandrel on the other instead of having two knives, as referred to in Sieg Patent 2,177,465.

The cutter heads 10 and 11 are driven from the main drive (not shown) through a speed change mechanism 15, which is desirably of the Reeves type, and which is shown as comprising two superposed pulleys, each including a pair of opposed axially slidable conical discs 16, and a power transmitting belt 17 passing over said pulleys between the discs. The discs 16 of one pair are slidably keyed to an input driving shaft 18, while the other two discs 16 are slidably keyed to an output shaft 20 having a drive connection to the cutter drums 10 and 11 as will be hereinafter described.

A pair of levers 21 are arranged on opposite sides of the pulleys, and are pivotally connected to the discs 16 and mounted for angular adjusting movement about fixed pivot supports 22. The lengths of these levers from their pivot supports 22 to the lower ends thereof are equal. The angular movement of the two Reeves levers 21 in opposite directions about their pivot mountings 22 causes the discs 16 of one pair to move axially away from each other and the discs of the other pair to move axially towards each other, so that the effective diameters of the pulleys are altered and the speed ratio between the input shaft 18 and the output shaft 20 correspondingly modified. This changes the frequency or total time cycle of the knives 13 in accordance with the desired change in sheet length without modifying the speed of travel of the paper. Each such change in the total time period of the cycle of the knives 13 would change the speed at the time of cutting, and therefore it is necessary that there be provided means whereby the knives are driven at varying speed in their cycle, and the speed is readjusted to correspond to the speed of the sheet material at the instant of cutting.

The speed varying mechanism is arranged between the output side of the Reeves 15 and the cutter heads 10 and 11, and may be of the general type disclosed in Behrens Patent No. 2,262,913. This mechanism comprises a crank arm 25 fixed to the shaft 26 of the lower cutting head 11, and a drive gear 27 rotatable on the hub of the crank arm, and having rigid therewith a crank arm 28, which is rotated at constant speed from the Reeves mechanism 15. The drive from this Reeves mechanism 15 comprises a shaft 30, a mitre gear connection 31 between the Reeves output shaft 20 and one end of said shaft 30, and a spur gear 32 fixed to the other end of said shaft 30 and driving the gear 27 through an idler (not shown).

Power is transmitted from the crank arm 28 to the crank arm 25 through a lever 35, journalled on the crank pin 36 of the crank arm 28 and provided with a guide slot extending lengthwise thereof for receiving the crank pin 37 of the crank arm 25 and a pivot support 38 about which the lever 35 swings. In the position shown in Fig. 2, the pivot 38 is in axial alignment with the drum shaft 26, so that the two crank arms 25 and 28 and the two cutter drums 10 and 11 rotate at the same constant angular velocity.

The pivot 38 is adjustable radially of the axis of the drum shaft 26 to vary the speed of the cutting drums 10 and 11 during each revolution thereof. For that purpose the pivot 38 is connected to a crosshead 40 mounted to slide in a stationary frame member or guide 41 extending along the diameter of the drum 11. This crosshead 40 is threaded on a screw shaft 42, so that the pivot 38 may be moved vertically and in a radial direction with respect to the shaft 26.

The screw shaft 42 is normally stationary so as to hold the pivot 38 in a predetermined adjusted position. In order to bring this pivot 38 to any degree of eccentricity in respect to the shaft 26, there is provided a mitre gear connection 44 between the screw shaft 42 and a shaft 45 driven through a speed reduction gear unit 46 from a control motor 47. The adjusting crosshead 40 is thereby moved in fixed ratio to the rotation of the motor 47.

The details of the cut-off mechanism so far described form per se no part of the present invention, but are merely those of one form which can be used in connection with the mechanism for adjusting the Reeves drive 15.

To impart to the Reeves drive 15 an adjusting movement bearing the proper varying ratio to the adjusting movement of the speed-varying crosshead 40, there is employed a crank lever 50, angularly displaceable about the axis of a fulcrum 51 by a power input link connection 52 actuated from the motor 47, and arranged between the lower ends of the two Reeves levers 21, in position to angularly move in a plane at right angles to the plane of pivotal movement of said Reeves levers 21. A pair of power output link connections 53 extending in opposite directions from the crank lever 50, transmit this angular displacement as adjusting movement to the Reeves levers 21. This angular displacement of the crank lever 50 serves to gradually vary the angles between the crank arms of said lever and their associated links 52 and 53, so that the Reeves levers 21 move at the proper variable ratio in relation to the movement of the crosshead 40.

The adjusting crank lever 50 is shown fulcrummed on a support 55, which is seated on the bed plate 56 of the cut-off, and which may be rigidly connected at its ends to the upright side frames 57 of the Reeves. This crank lever support 55 is formed with a horizontal bearing projection 58 spaced above the base of said support to receive therebetween the fulcrum center section of the adjusting lever 50 with a snug rotative fit. A stud 51 passing through aligned holes in the bearing portions of the support 55 and in the crank lever 50 serves as the fulcrum pin for said lever. A cap screw 61 in the axial bore of the stud 51 is threaded in the bed plate 56 to hold said stud in position.

The lever 50 is shown T-shaped with one crank arm 61 serving as a power input member and the other two arms 62 serving as power output members. The two power output crank arms 62 are shown of equal length with their common lines of action passing through the fulcrum center of the lever, while the power input crank arm 61 is shown with its center line extending obliquely to said common lines of action.

The relative lengths of these crank arms 61 and 62 and their relative angular positions depend on the variable relation desired between the movement of the crosshead 40 and that of the Reeves lever 21, and this relationship in turn depends on the size of the cut-off, size of the Reeves, and the length of the various link connections to the crank levers 50.

For driving the power link connection 52, the motor 47 drives a shaft 66 through the speed reduction unit 46. This shaft 66, which is desirably an extension of the shaft 45, has at its output end a feed screw connection with one end of a crosshead nut 67 slidable in a guide 68 fastened to the bed plate 56. At its other end this crosshead nut 67 has a pivotal connection with one end of the link 52, the other end of which is pivotally connected to the crank arm 61.

Because of the relative positions of the adjustable parts of the speed-varying mechanism and the Reeves drive, it has been found desirable to slant the shaft or shafts 45, 66 downwardly towards said Reeves drive, and to correspondingly incline the slideway in the guide 68. Since the crank lever 50 is mounted for angular displacement about a vertical axis, there is limited universal movement between the incline moving crosshead nut 67 and the adjoining end of the link 52, and between the other end of said link and the crank arm 61. To permit this limited universal movement, the nut 67 is formed with a pair of spaced fork projections 70 at one end. A rotatable pivot block 71 is supported between these fork projections 70 by means of a pivot pin 72, and has a pair of opposed gudgeons 73 at right angles to the axis of said pivot pin, journalled in the arms of a U-shaped yoke or clevis 74 formed at one end of the link 52. At the other end of the link 52, a similar universal connection with the power input crank arm 61 comprises a clevis 75 on said link disposed between fork projections at the outer end of said crank arm. A pivot block 77 is rotatably held between these crank arm projections by a pivot pin 78, and has opposed gudgeons at right angles to the axis of said pin journalled in the arms of the link clevis 75.

The power output links 53 also have limited universal connections with the crank arms 62 and the Reeves levers 21, to compensate for the swinging of the lower ends of these levers in a generally inclined direction. For that purpose, each of these Reeves levers 21 comprises a pair of side pieces 80, rigidly interconnected as a unit and having at their lower ends a swivel link bar 81 provided with end gudgeons 82 journalled in said side pieces. The central section of this link bar 81 lies between a pair of fork projections 83 at one end of the corresponding link 53, and is pivotally connected thereto by means of a pin 84. The universal connection between the other end of each of the links 53 and its respective crank arm 62 comprises a pivot block 86, rotatably held between the fork projections at the outer end of said crank arm by a pivot pin 88, and having a knuckle joint connection with a clevis 89 at the end of said link 53.

In order to brace the lower ends of the Reeves levers 21 against the thrust of the links 53 in a direction transverse to the direction of adjusting movement of said levers, the crank lever support member 55 is provided with a pair of slideways 90, inclined according to the general swing of the lower ends of the Reeves levers in their adjusting movements. Suitable side thrust roller bearings 91 connected to the lower ends of the pivot pins 84 are movable in respective slideways 90 and bear against the side walls of said slideways.

As the belt of the Reeves drive may become stretched under some operating conditions, means are provided for restoring the desired relationship between the Reeves drive 15 and the adjusting crosshead 40. As shown, each of the links 52 and 53 is mounted with a turnbuckle coupling to permit adjustments in the effective lengths of said links, and the corresponding movement of the Reeves levers. As shown, the link 52 includes a shank 95 rigid with the clevis 74 and threaded into the clevis 75. In each of the links 53 the turnbuckle coupling is shown comprising a shank 96 rigid with the clevis 89 and threaded into a nut 97 forming part of the pivot connection to the link 81.

The sheet length is registered by an indicator directly from one of the Reeves levers 21. The speed of the Reeves drive in respect to the speed of the sheet is the prime controlling factor in determining sheet length, since definite positioning of the Reeves levers 21 results in definite speeds of said drive. As one feature of the invention, there are provided direct connections between one of the Reeves levers and the sheet length indicating device, so that accurate setting of sheet length may be obtained irrespective of any lost motion in the Reeves adjusting mechanism.

To effect this direct connection, a sheet length indicating lever 100 is connected to one end of a shaft 101, the other end of which carries a crank lever 102. A link 103 has its ends pivotally connected in this crank lever 102, and to a bracket 104 fixed to the lower end of one of the Reeves levers 21.

As the two Reeves levers 21 are angularly adjusted in accordance with the desired sheet length, the indicating lever 100 is moved over a scale 105 calibrated to indicate sheet length. This scale is mounted on the operating side of the cut-off machine on a cover plate 106, and is shown of quadrant segmental shape. The indicating lever 100 extends behind this cover plate 106, but has its free end section passing through a segmental slot 107 directly over the scale 105, to form an exposed pointer 108 adapted to ride over said scale.

In some cases it may be desired to automatically stop the motor 47 of the Reeves adjuster when the required adjustment for a different sheet length has been made. In such case, I may provide a manually operable preselector lever 110 having a hub 111 rotatably embracing a fixed bearing 112, which coaxially encircles the shaft 101, so that this lever can be angularly moved manually concentrically with respect to the sheet length indicating lever 100.

The preselector lever 110 has its free end section U-shaped to loosely receive therein the U-shaped end portion of the indicating lever 100 when the latter lever is moved into registry with said preselector lever. The outer end section of this preselector lever 110 passes through the cover slot 107, and is formed with an exposed end flange 113, which defines a radial selector bevel edge 114 adapted to ride over the scale 105, and which carries a hand screw 115 by which the lever 110 is locked in selected position. A notch 116 in this end flange 113 permits a view of the pointer 108 when the two levers 100 and 110 are in registry.

A limit switch 120 in the circuit of the motor 47 is connected to the lever 110, and is adapted to be opened by a trip 121 carried by the indicating lever 100.

In selecting a new sheet length, the preselector lever 110 is moved over the scale 105 until its indicating edge 114 registers with the desired sheet length on said scale and the lever is locked in this position by the screw 115. When the desired number of sheets of a given length have been cut, the circuit of the motor 47 is closed, and the motor operates to effect simultaneous adjustments in the Reeves drive and the speed-varying drive. While this adjustment is being made, the adjusting movement of the Reeves levers 21 is transmitted to the indicating lever 100, which is moved over the scale 105 until it comes into registry with the preselector lever 110. In this position, the limit switch 120 will be opened by the trip 121 and the circuit of the adjusting motor 47 will be opened. The machine will then be set to cut sheets of new selected length.

As many changes can be made in the above apparatus, and many apparently widely different embodiments of this invention can be made without departing from the scope of the claims, it is intended that all matter contained in the above description or shown in the accompanying drawings shall be interpreted as illustrative and not in a limiting sense.

What is claimed is:

1. A speed change drive of the Reeves type having a pair of pulleys, a pair of oppositely movable adjusting levers for changing the effective relative diameters of said pulleys, and a linkage for moving said levers in opposite directions, and including a pair of links having their outer ends connected to said levers respectively, slideways for said outer ends, a lever having a pivotal support intermediate of its ends and having its ends pivotally connected to the inner ends of said links respectively, said latter lever being arranged for angular movement in a plane substantially at right angles to the plane of pivotal movement of said adjusting levers, and means for swinging said last-mentioned lever about its pivotal support to move said first-mentioned levers toward or from each other and thereby vary the effective relative diameters of said pulleys.

2. A speed change drive of the Reeves type having a pair of opposed levers by which the total drive ratio is adjusted, a rotatable control member, a crank having three crank arms and extending between said opposed levers in position for pivotal movement in a plane substantially at right angles to the plane of pivotal movement of said levers, a drive link connection from said control member to one of said crank arms for rotating said crank, and a pair of link connections from the other two crank arms to said speed change levers respectively for moving said levers in opposite directions at a predetermined variable rate with respect to the rotation of said control member to effect adjustment in said speed change drive.

3. A speed change drive of the Reeves type having an adjusting member by which the driven speed may be varied, a control member, a crank having a plurality of crank arms, a link connection from said control member to one of said crank arms, and a link connection from another of said crank arms to said adjusting member for moving said member and thereby varying the relative input and output speeds of said speed change drive, at least one of said links being adjustable in length to modify the variation in rate of movement of said speed ratio adjusting member.

4. A speed change drive of the Reeves type having an adjusting member by which the driven speed may be varied, a rotatable control member having a threaded section, a non-rotatable member engaging said threaded section, a crank having a plurality of crank arms, a link connection from said non-rotatable member to one of said crank arms, and a link connection from another of said crank arms to said adjusting member for moving said member and thereby varying the relative input and output speeds of said speed change drive.

5. A speed change drive of the Reeves type having a pair of speed ratio adjusting levers pivotally supported for angular adjusting movement in opposite directions, an adjusting motor, an adjusting crank between said levers defining a plurality of crank arms and having a pivotal movement in a plane substantially at right angles to the plane of pivotal movement of said levers, a drive connection from said motor to one of said crank arms including a link for rotating said crank, and a pair of links extending in opposite directions from the other two crank arms to said adjusting levers respectively for moving said levers in opposite directions at a variable rate with respect to the rotation of said motor.

6. A speed change drive of the Reeves type having a pair of speed ratio adjusting levers pivotally supported for angular adjusting movement in opposite directions, an adjusting motor, an adjusting crank comprising a plurality of crank arms, a drive connection from said motor to one of said crank arms including a link for oscillating said crank, means for varying the effective length of said link, a pair of links extending in opposite directions from the other two crank arms to said adjusting levers respectively for moving said levers in opposite directions at a variable rate with respect to the rotation of said motor, and means for varying the effective lengths of said last-mentioned links.

7. A speed change drive of the Reeves type having a pair of speed ratio adjusting levers pivotally supported for angular adjusting movement in opposite directions, an adjusting motor, a shaft driven thereby, a slide, threaded connections between said shaft and said slide, an adjusting crank defining a plurality of crank arms, a drive connection from said slide to one of said crank arms including a link for rotating said crank, and a pair of links extending in opposite directions from the other two crank arms to said adjusting levers respectively for moving said levers in opposite directions at a variable rate with respect to the rotation of said motor.

8. In a cut-off mechanism of the type having a knife which cuts a continuously advancing sheet into sections, and which travels with said sheet at the instant of cutting, and a speed change drive of the Reeves type for said knife having a speed ratio adjusting member by which the total time cycle of said knife is changed, the combination comprising a control member, an adjusting lever, and a crank link connection between said lever and said control member for moving said lever at a variable predetermined rate with respect to the movement of said control member.

9. In a cut-off mechanism of the type having a knife which cuts a continuously advancing sheet into sections, and which travels with said sheet at the instant of cutting, a speed change drive of the Reeves type having a speed ratio adjusting member by which the total time cycle of said knife is changed, and a mechanism for driving said knife at a varying speed during its cycle and at the speed of the sheet during cutting, and having an element adjustable to modify the variations in speed of said knife, the combination comprising a control adjusting motor, means driven from said motor for moving said adjustable element at a constant rate relative to the rotation of said motor, and means including a linkage driven from said motor for moving said speed ratio adjusting member simultaneously with the adjusting movement of said element but at a rate varying with respect to the rotation of said motor to conform the total time cycle change in the knife with the adjustment in variation in the speed of said knife, whereby the cutting speed of the knife is maintained constant for all changes in the length of sections cut.

10. In a cut-off mechanism of the type having a knife which cuts a continuously advancing sheet into sections, and which travels with said sheet at the instant of cutting, a speed change drive of the Reeves type having a speed ratio adjusting member for changing the length of sections cut, and a mechanism for driving said knife at a varying speed during its cycle and at the speed of the sheet during cutting, and having an element adjustable to modify the variations in speed of said knife, the combination comprising an adjusting control member, means driven from said control member for moving said adjustable element at a constant rate relative to the movement of said control member and in accordance with changes in length of sections cut, and means driven from said control member for moving said speed ratio adjusting member simultaneously with the adjusting movement of said element but at a variable rate with respect to the movement of said control member to maintain the speed of the knife constant for all changes in the length of sections cut.

11. In a cut-off mechanism of the type having a knife which cuts a continuously advancing sheet into sections, and which travels with said sheet at the instant of cutting, an infinite speed change drive for said knife having a speed ratio adjusting member by which the total time cycle of said knife is changed to alter the length of sections cut, and a mechanism for driving said knife at a varying speed during its cycle and at the speed of the sheet during cutting, the combination comprising an adjusting control member, means driven from said control member for adjusting the variation in speed of said knife during its cycle in accordance with the changes in the total time cycle of said knife, and means driven from said control member for moving said speed ratio adjusting member simultaneously with the adjustments in said speed variation, but at a variable rate with respect to the movement of said control member to effect changes in the total time cycle of the knife corresponding to said adjustments in speed variation, and to thereby maintain the cutting speed of said knife constant and equal to that of the traveling material for all changes in the length of sections cut.

12. In a machine having a knife for periodically cutting a travelling sheet into sections of predetermined length, the combination comprising an oscillating member for indicating the length of sheet cut, a speed change drive of the Reeves type for said knife having an element movable in accordance with adjustments in the speed ratio of said drive, a shaft for operating said indicating member, and a crank and link connection between said element and said shaft for directly moving said indicating member by the movement of said element.

13. In a machine having a knife for periodically cutting a travelling sheet into sections, the combination comprising an oscillating member for indicating the length of sheet cut, a speed change drive of the Reeves type for said knife and having an adjusting lever by which the speed ratio of said drive is changed, and a direct connection between said lever and said indicating member for moving said indicating member by the movement of said lever.

14. In a machine for cutting a travelling web into sheets, a speed change drive of the Reeves type having an adjusting lever by which the speed ratio of said drive is changed, an oscillatory shaft, link connections between said lever and said shaft, and a pointer secured to said shaft for indicating the extent to which the speed change ratio of said drive has been adjusted.

HERBERT C. BEHRENS.